United States Patent
Lieh et al.

(10) Patent No.: US 11,202,728 B2
(45) Date of Patent: Dec. 21, 2021

(54) TRANSMISSION APPARATUS FOR A LEVERAGED WHEELCHAIR

(71) Applicants: Junghsen Lieh, Beavercreek, OH (US); Shih-Yi Lu, Taichung (TW); Shi-Chang Tseng, Yunlin (TW)

(72) Inventors: Junghsen Lieh, Beavercreek, OH (US); Shih-Yi Lu, Taichung (TW); Shi-Chang Tseng, Yunlin (TW)

( * ) Notice: Subject to any disclaimer, the term of this patent is extended or adjusted under 35 U.S.C. 154(b) by 306 days.

(21) Appl. No.: 16/556,123

(22) Filed: Aug. 29, 2019

(65) Prior Publication Data
US 2021/0059877 A1 Mar. 4, 2021

(51) Int. Cl.
| | |
|---|---|
| *A61G 5/10* | (2006.01) |
| *A61G 5/02* | (2006.01) |
| *F16H 19/08* | (2006.01) |
| *B62M 1/28* | (2013.01) |
| *B62M 9/00* | (2006.01) |
| *B62M 9/02* | (2006.01) |

(52) U.S. Cl.
CPC ............ *A61G 5/1051* (2016.11); *A61G 5/025* (2013.01); *F16H 19/08* (2013.01); *A61G 5/023* (2013.01); *B62M 1/28* (2013.01); *B62M 9/00* (2013.01); *B62M 9/02* (2013.01); *F16H 2019/085* (2013.01)

(58) Field of Classification Search
CPC ........ A61G 5/21; A61G 5/1051; A61G 5/025; F16H 2019/085; F16H 19/08; B62M 1/24; B62M 1/28; B62M 1/30; B62M 9/02; B62M 9/00
See application file for complete search history.

(56) References Cited

U.S. PATENT DOCUMENTS

| | | | | |
|---|---|---|---|---|
| 834,368 | A * | 10/1906 | Dews .................... | B62M 1/12 280/234 |
| 2,518,642 | A * | 8/1950 | Schneider ............... | B62M 1/14 280/245 |
| 4,811,964 | A * | 3/1989 | Horn ..................... | A61G 5/023 188/2 F |
| 4,925,200 | A * | 5/1990 | Jones ..................... | B62K 5/02 280/233 |
| 5,632,499 | A * | 5/1997 | Hutcherson ........... | A61G 5/023 280/246 |
| 5,713,590 | A * | 2/1998 | Clark .................... | B62K 3/005 280/247 |

(Continued)

*Primary Examiner* — Minnah L Seoh
*Assistant Examiner* — Harold Eric Pahlck, III
(74) *Attorney, Agent, or Firm* — Che-Yang Chen; Law Office of Michael Chen

(57) ABSTRACT

A transmission apparatus for a leveraged wheelchair may include a wheelchair, a driving mechanism, a driving wheels set, and a transmission wheels set. The driving mechanism has a first tube and a second tube which are pivotally connected, and with the relative movements between the first tube and the second tube, the driving wheels set can have forward or rearward rotation so as to achieve bi-direction driving effect of the wheelchair. Also, the relative movement between the first tube and the second tube is cooperated with a flexible connecting head such that a handle of the wheelchair is adapted to be forward and rearward pulled or rotated axially so as to achieve the moving and turning actions of the wheelchair with one hand.

10 Claims, 13 Drawing Sheets

(56) References Cited

U.S. PATENT DOCUMENTS

| | | | | |
|---|---|---|---|---|
| 5,829,772 A * | 11/1998 | Jones | ................ | B62K 9/00 |
| | | | | 280/234 |
| 6,676,148 B1 * | 1/2004 | Gu | ................ | B62K 9/00 |
| | | | | 280/244 |
| 6,715,780 B2 * | 4/2004 | Schaeffer | ................ | A61G 5/023 |
| | | | | 280/248 |
| 6,932,370 B2 * | 8/2005 | Jones | ................ | B62K 3/005 |
| | | | | 280/282 |
| 6,942,234 B1 * | 9/2005 | Chait | ................ | B62M 1/16 |
| | | | | 280/244 |
| 7,195,264 B2 * | 3/2007 | Drymalski | ................ | B62K 3/005 |
| | | | | 280/246 |
| 7,584,976 B2 * | 9/2009 | Bayne | ................ | A61G 5/023 |
| | | | | 280/244 |
| 8,118,320 B2 * | 2/2012 | Lee | ................ | B62M 1/16 |
| | | | | 280/240 |
| 9,051,025 B2 * | 6/2015 | Schminkey | ................ | B62M 1/16 |
| 9,296,446 B2 * | 3/2016 | Schminkey | ................ | B62M 1/16 |
| 10,479,439 B2 * | 11/2019 | Jones | ................ | B62M 1/16 |
| 10,843,768 B2 * | 11/2020 | Jones | ................ | B62K 5/05 |
| 2003/0116939 A1 * | 6/2003 | Monteagudo | ................ | B62M 1/14 |
| | | | | 280/244 |
| 2003/0178807 A1 * | 9/2003 | Drymalski | ................ | B62M 1/14 |
| | | | | 280/243 |
| 2012/0187649 A1 * | 7/2012 | Bayne | ................ | B62M 1/16 |
| | | | | 280/242.1 |
| 2016/0229484 A1 * | 8/2016 | Bayne | ................ | B62K 11/007 |

\* cited by examiner

TRANSMISSION APPARATUS FOR A LEVERAGED WHEELCHAIR

FIELD OF THE INVENTION

The present invention relates to a transmission apparatus and more particularly to a transmission apparatus for a leveraged wheelchair that can achieve moving forward, turning, and bi-direction propulsion driving with one hand.

BACKGROUND OF THE INVENTION

A conventional manual wheelchair comprises two driving wheels pivotally connected at two sides thereof, and each of the driving wheels is connected to a push ring allowing a user to use both hands to drive the wheelchair forward. When the wheelchair needs to be turned, the user can push the two push rings with different strengths, and with the different speeds of the driving wheels, the wheelchair is configured to achieve the turning action.

However, the conventional wheelchair has the following disadvantages: (i) when the wheelchair needs to be moved straight forward, a user has to evenly push the push rings by two hands, which is difficult for the user to operate; (ii) when the wheelchair is moved in uphill or downhill environments, it is more dangerous for a user to operate; (iii) the user has to keep moving hands to push the push rings, which makes the wheelchair to be moved in unsteady speeds and be easy to cause soreness and fatigue of user's hands; and (iv) it is inconvenient that a user needs two hands to operate the wheelchair. Therefore, there remains a need for a new and improved transmission apparatus for a wheelchair to overcome the problems presented above.

SUMMARY OF THE INVENTION

The present invention provides a transmission apparatus for a leveraged wheelchair which comprises a wheelchair, a driving mechanism, a driving wheels set, and a transmission wheels set. The wheelchair has a frame body to install at least a front wheel and two rear wheels, and an output shaft having an output wheel installed thereon is connected between the two rear wheels. The frame body comprises a first cross bar, a second cross bar, and a third cross bar installed thereon which are formed parallel with the output shaft. Moreover, the first cross bar, the second cross bar, and the third cross bar are arranged in sequence from a position adjacent to the front wheel. Furthermore, a front arm vertically protrudes from the second cross bar from a position adjacent to an end thereof, and two rear arms respectively and vertically protrude from the third cross bar. The driving mechanism has a first tube, a second tube, and a flexible connecting head. The first tube is secured on the second cross bar of the frame body. The first tube comprises a right assembling piece and a left assembling piece respectively formed at two sides thereof and located symmetrically away from the second cross bar, and a turning shaft is configured to axially penetrate through and pivotally connect to the first tube. The turning shaft is connected to the front wheel so as to achieve the turning action. The second tube comprises a right connecting piece and a left connecting piece which are extended from an end of the second tube and located symmetrically. The right connecting piece is pivotally connected to the right assembling piece so as to enable the second tube to be moved relative to the first tube. A driving shaft penetrates through and is secured with the left connecting piece, and the left connecting piece is pivotally connected to the left assembling piece through the driving shaft. The driving shaft is adapted to penetrate through the front arm. An actuating shaft, which axially penetrates through the second tube, has a handle extending from an end of the actuating shaft, and the other end of the actuating shaft is connected to the turning shaft through the flexible connecting head. Through the flexible connecting head, the handle and the turning shaft are configured to have synchronous movement without intervening the relative movement between the first tube and the second tube. The driving wheels set comprises a first rotating wheel, a first gear, a driven shaft, a second rotating wheel, and a second gear. The first rotating wheel is installed on the driving shaft through a first ratchet wheel so as to have synchronously forward rotation with the driving shaft. The first gear is disposed on the driving shaft. The driven shaft penetrates through and is coupled between the front arm and the left assembling piece so as to dispose the second rotating wheel on the driven shaft through a second ratchet wheel and to enable the second rotating wheel and the driven shaft to have synchronously forward rotation. Furthermore, the second gear disposed on the driven shaft is engaged with the first gear. The transmission wheels set comprises a first wheel body, a first flexible element, a second wheel body, a second flexible element, a third wheel body, a third flexible element, and a transmission axle. The transmission axle axially penetrates through the first wheel body, the second wheel body, and the third wheel body, and two ends of the transmission axle are respectively and pivotally connected to the two rear arms. The first flexible element is connected between the first rotating wheel and the first wheel body, and the second flexible element is connected between the second rotating wheel and the second wheel body while the third flexible element is connected between the third rotating wheel body and the output wheel.

Comparing with conventional wheelchair, the present invention is advantageous because: (i) with different relative movements between the first tube and the second tube, the driving wheels set can have forward or rearward rotation so as to achieve bi-direction driving effect of the wheelchair; (ii) the relative movement between the first tube and the second tube is cooperated with the flexible connecting head such that the handle is adapted to be forward and rearward pulled or rotated axially so to achieve the moving and turning actions of the wheelchair with one hand; (iii) each of the first ratchet wheel and the second ratchet wheel is one-way characteristic such that a user can pull the handle forward or rearward to drive the first rotating wheel or the second rotating wheel, and the power can be transmitted from the first flexible element or the second flexible element to the third wheel body to keep the wheelchair moving forward, thereby achieving the effects of bi-direction driving and labor saving; (iv) the driving shaft is connected to the second tube of the driving mechanism so as to secure the handle at a specific position, so that the handle is at a stationary position when the wheelchair is not operated; and (v) the handle is adapted to control the front wheel(s) for turning while the rear wheels are adapted to keep rotating forward, which enables the wheelchair to be operated by a user and pushed by a caregiver at the same time.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior inventions.

Figure 1:
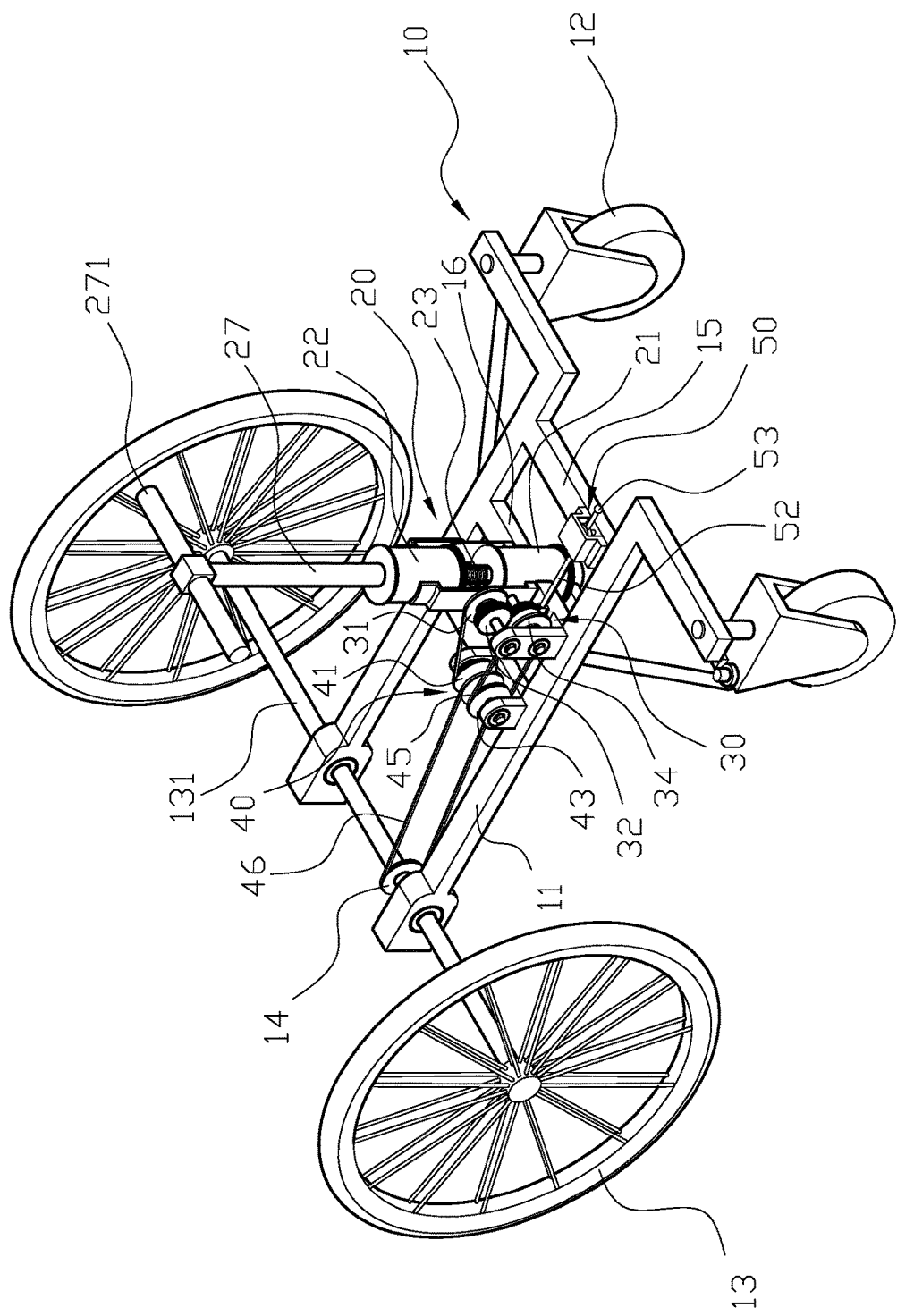
FIG. 1 is a three-dimensional assembly view of a transmission apparatus for a leveraged wheelchair of the present invention.
Figure 2:
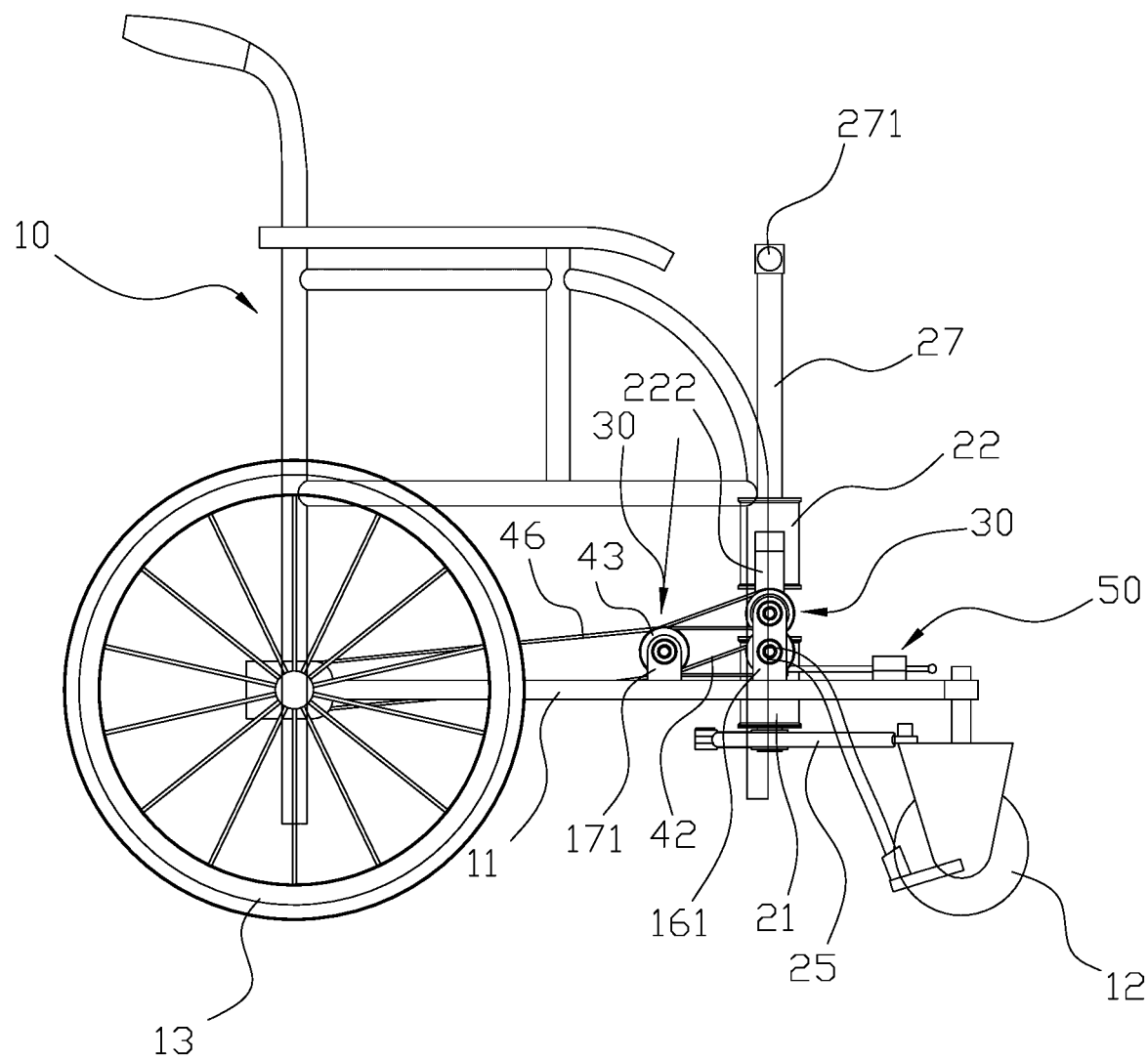
FIG. 2 is a structure diagram of a wheelchair in the present invention.
Figure 3:
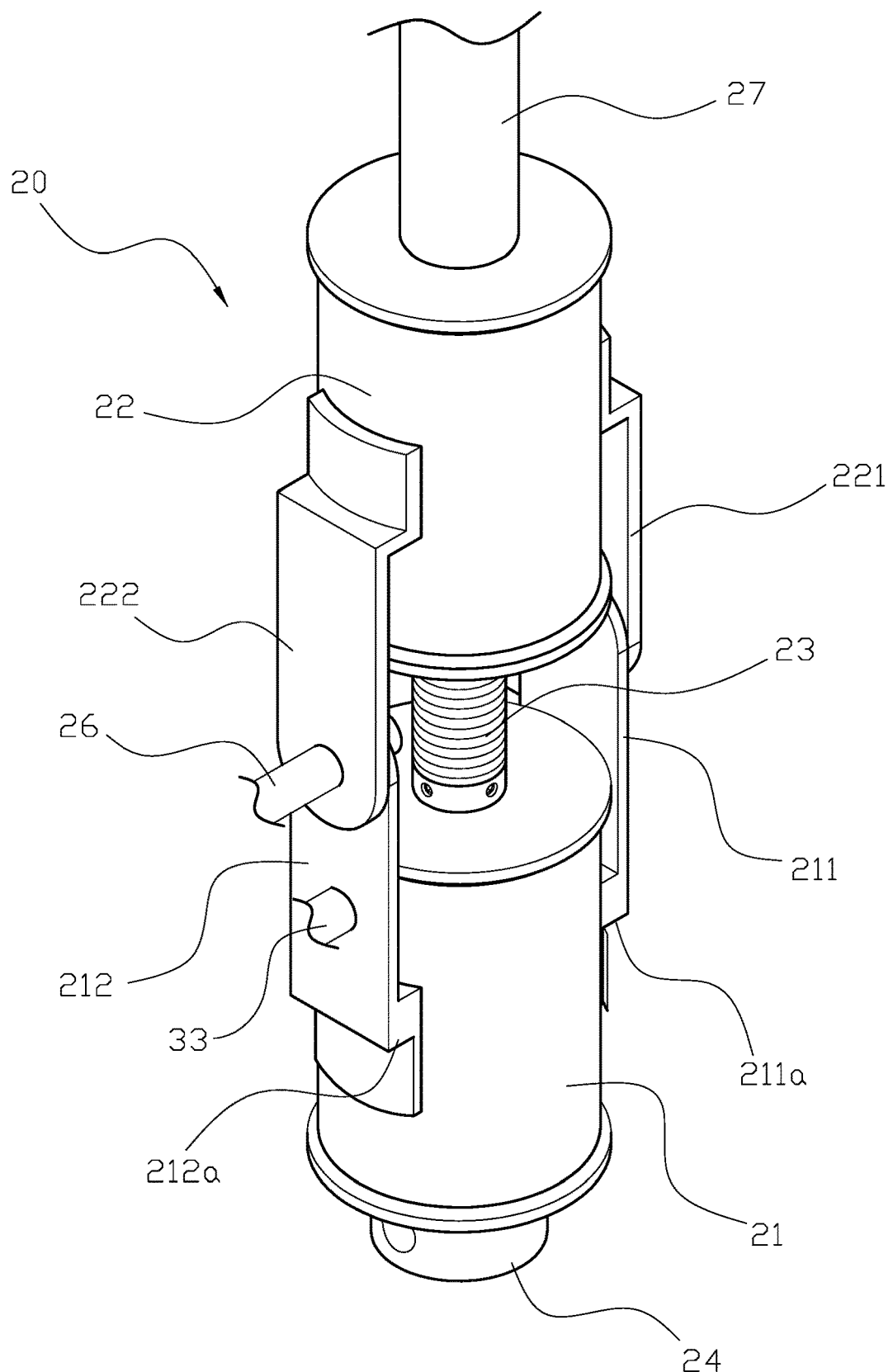
FIG. 3 is a three-dimensional assembly view of a driving mechanism of the present invention.
Figure 4:
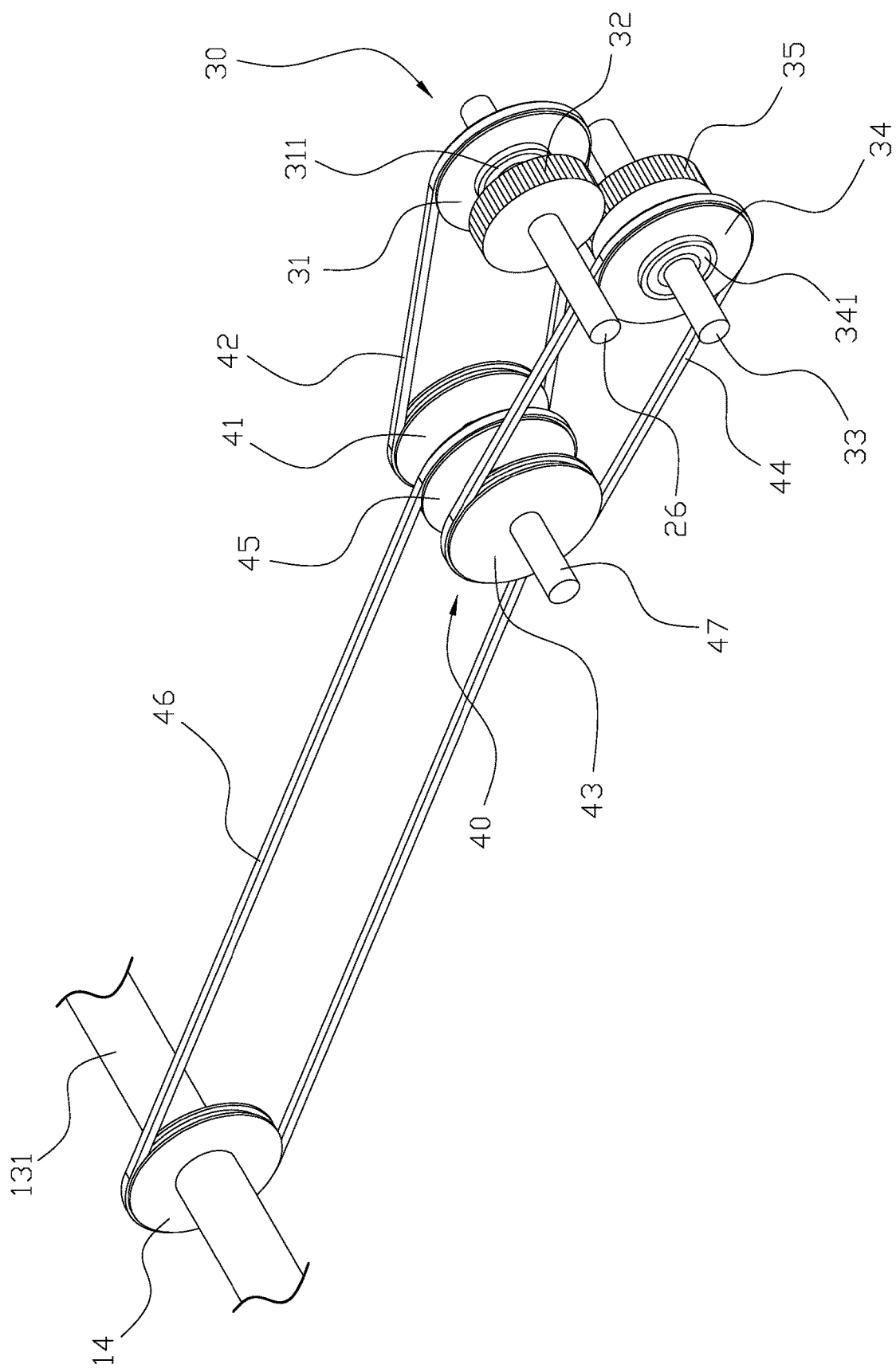
FIG. 4 is a three-dimensional assembly view of a driving wheels set together with a transmission wheels set of the present invention.
Figure 5:
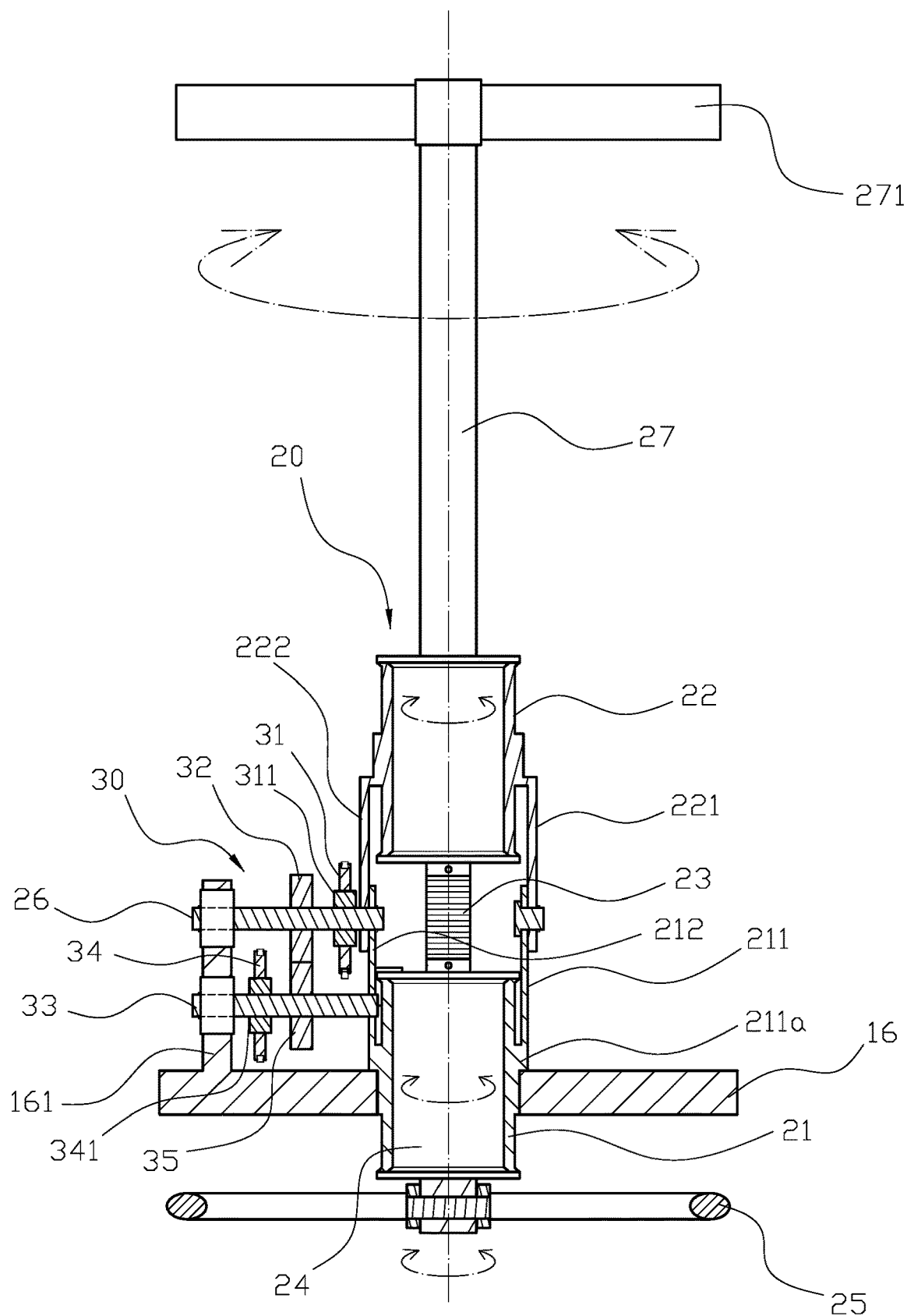
FIG. 5 is a first schematic view illustrating the transmission apparatus of the present invention executes the turning action.
Figure 6:
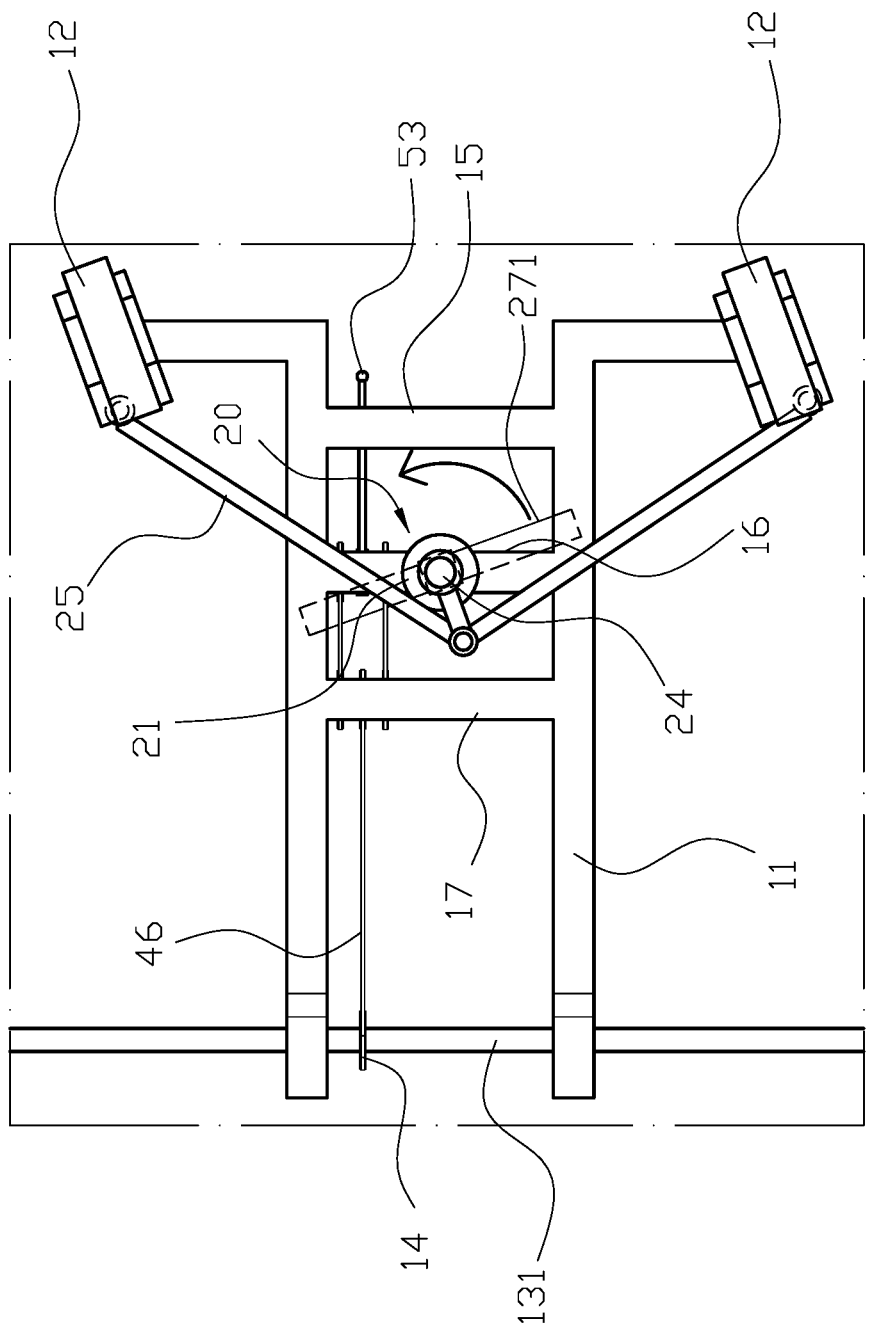
FIG. 6 is a second schematic view illustrating the transmission apparatus of the present invention that executes the turning action.
Figure 7:
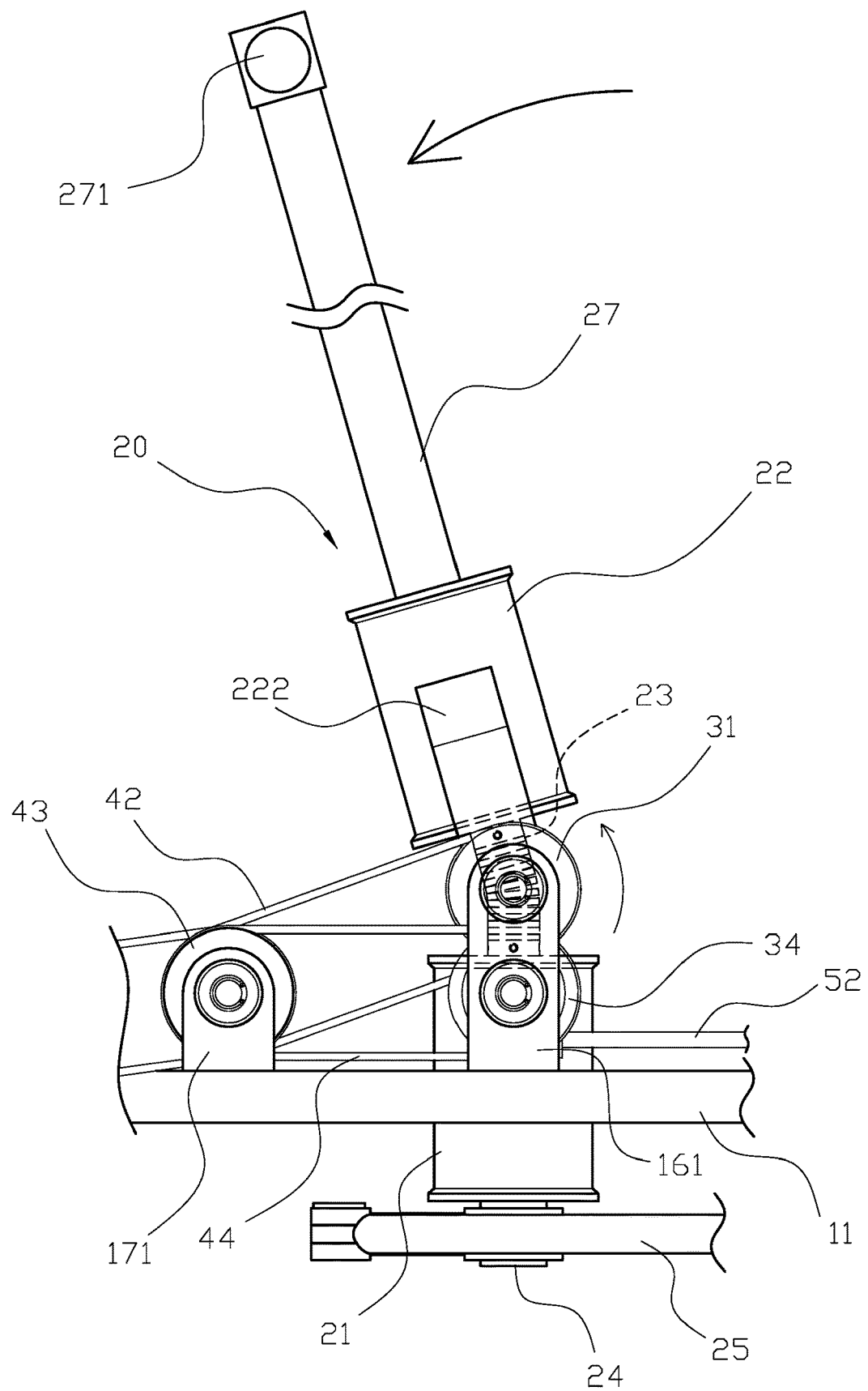
FIG. 7 is a schematic view illustrating a handle of the present invention that is pulled rearward.
Figure 8:
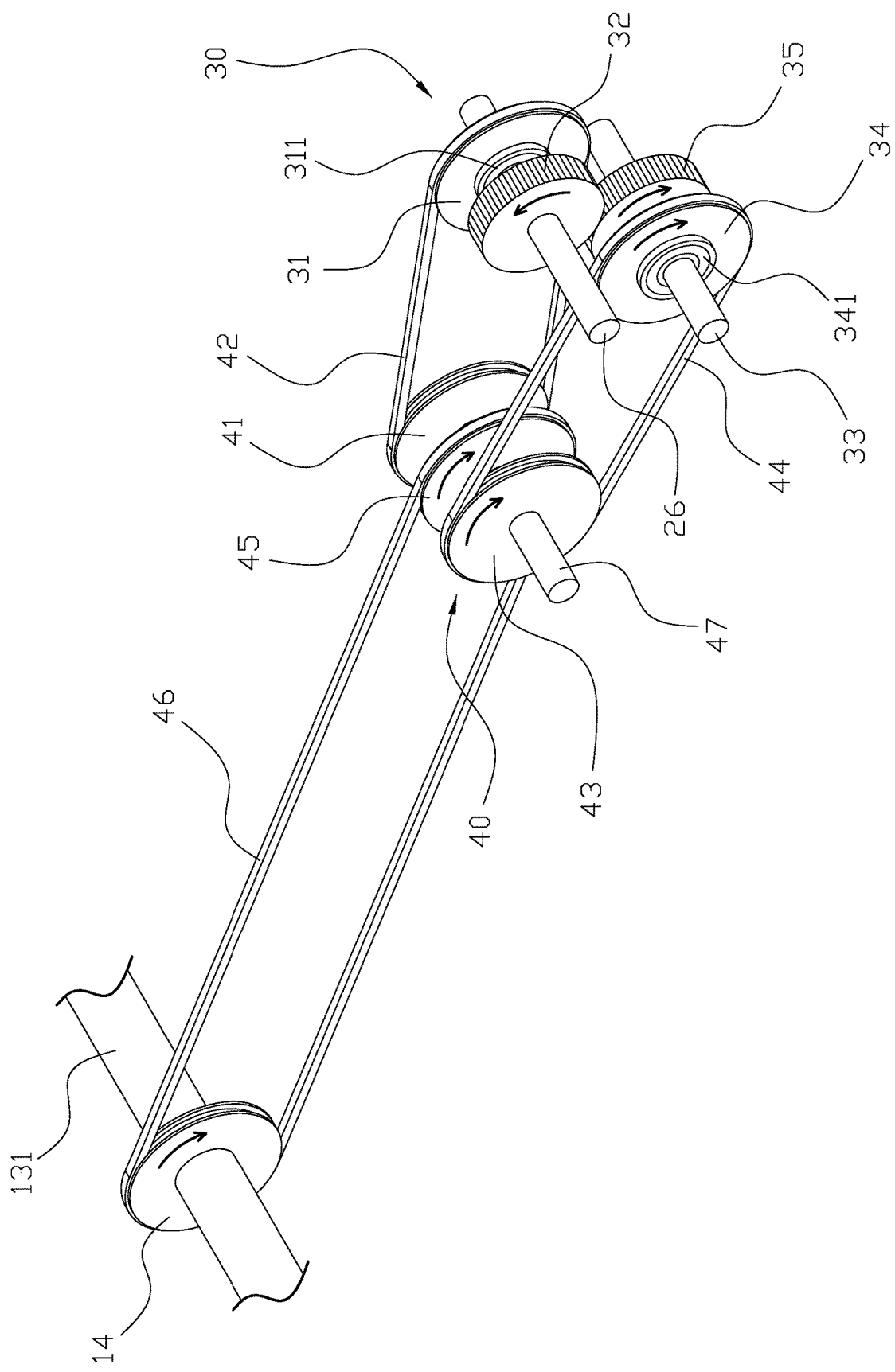
FIG. 8 is a schematic view illustrating a second rotating wheel that is rotated forward.
Figure 9:
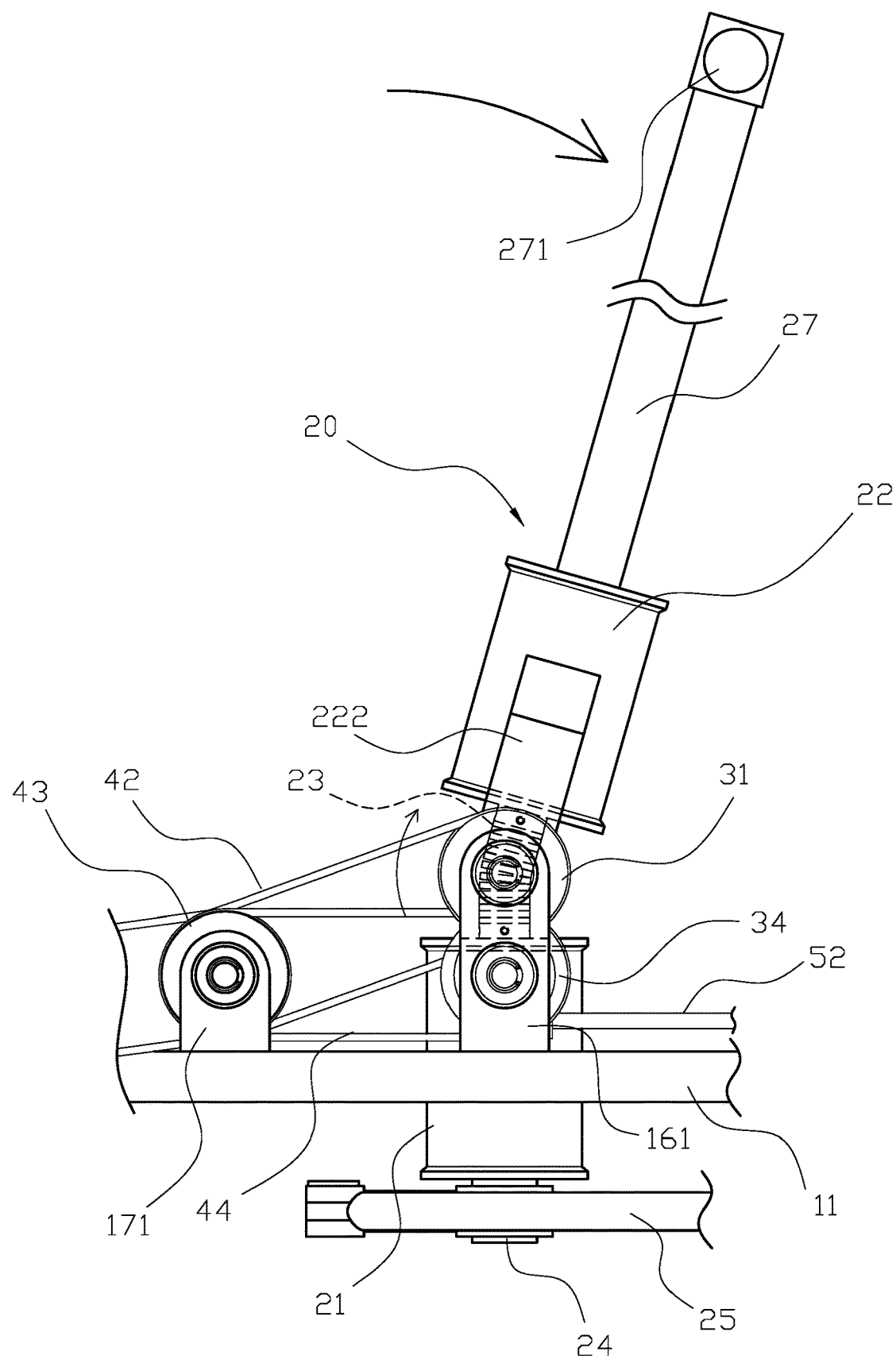
FIG. 9 is a schematic view illustrating a handle of the present invention that is pulled forward.
Figure 10:
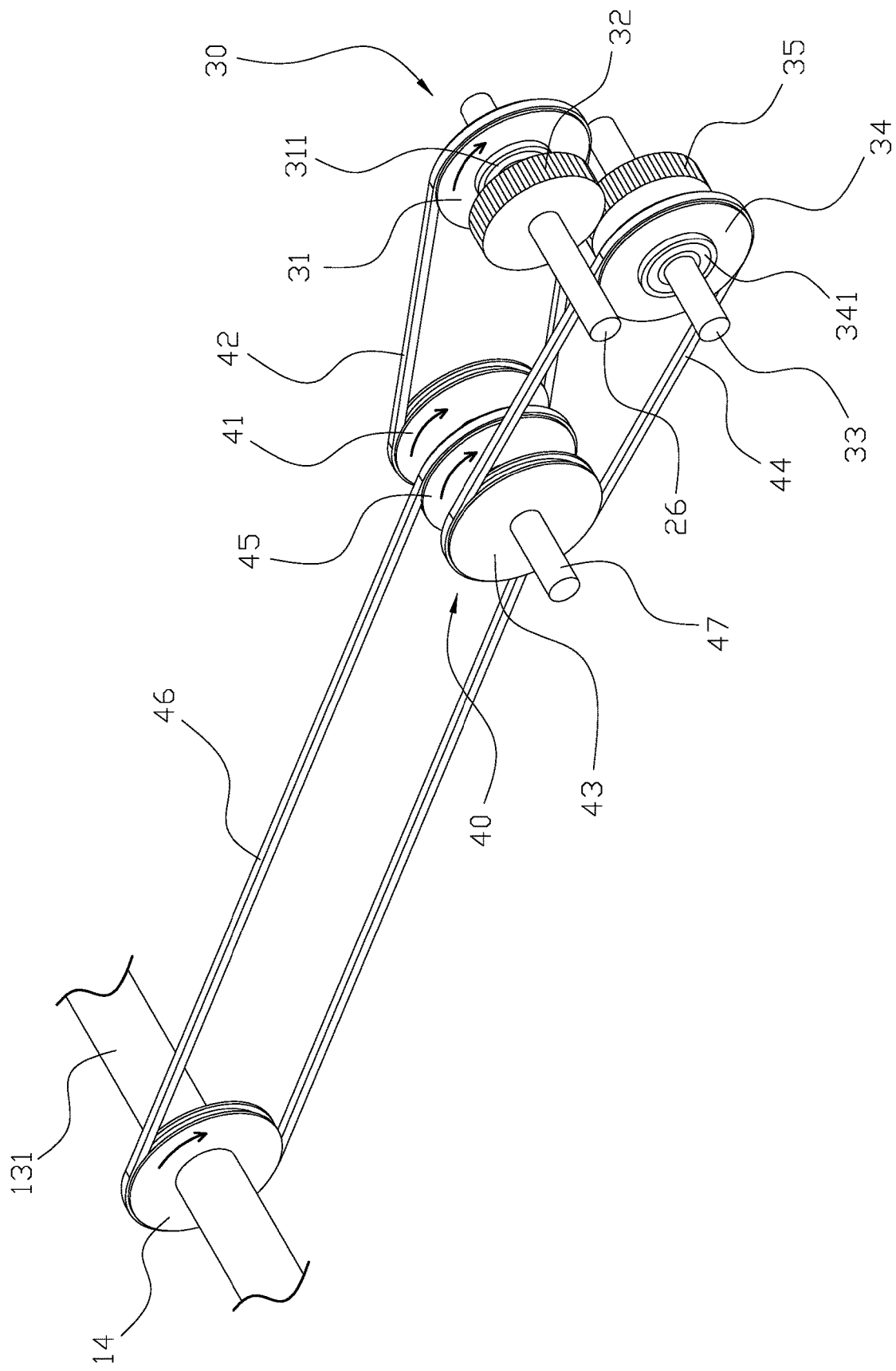
FIG. 10 is a schematic view illustrating a first rotating wheel that is rotated forward.
Figure 11:
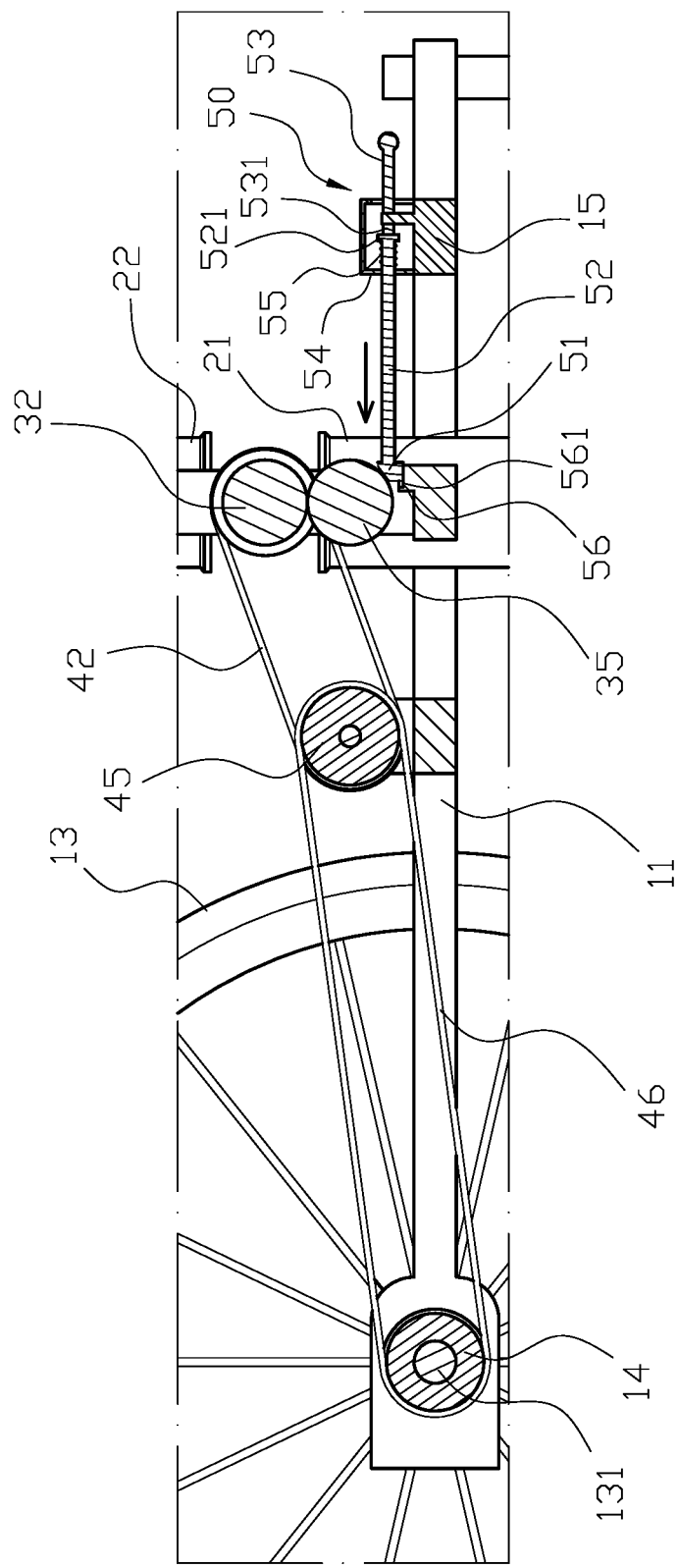
FIG. 11 is a first schematic view illustrating the transmission apparatus of the present invention that is operated.
Figure 12:
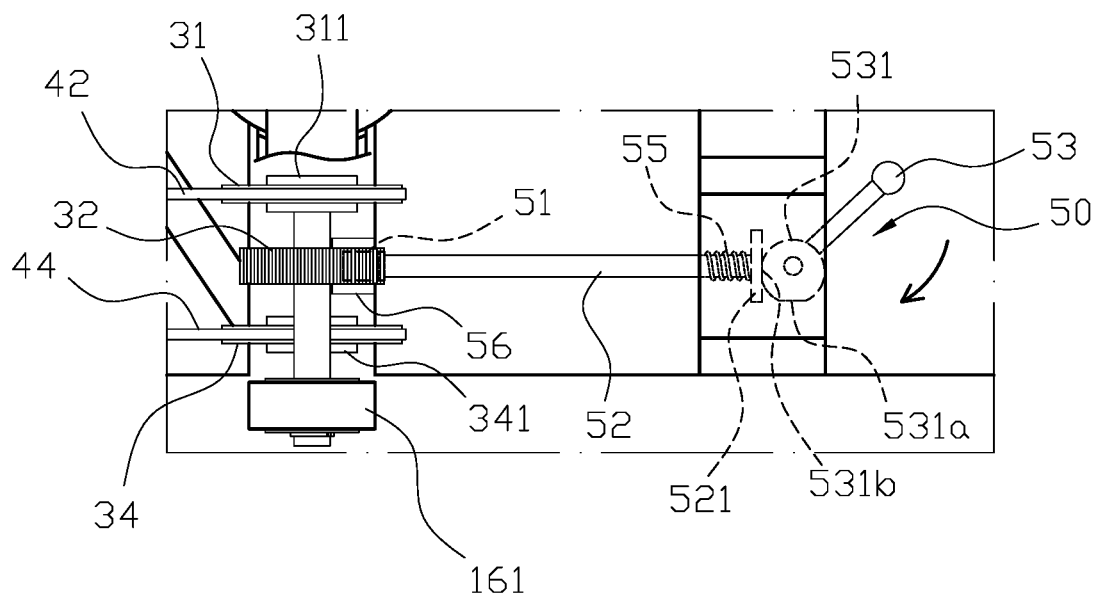
FIG. 12 is a second schematic view illustrating the transmission apparatus of the present invention that is operated.
Figure 13:
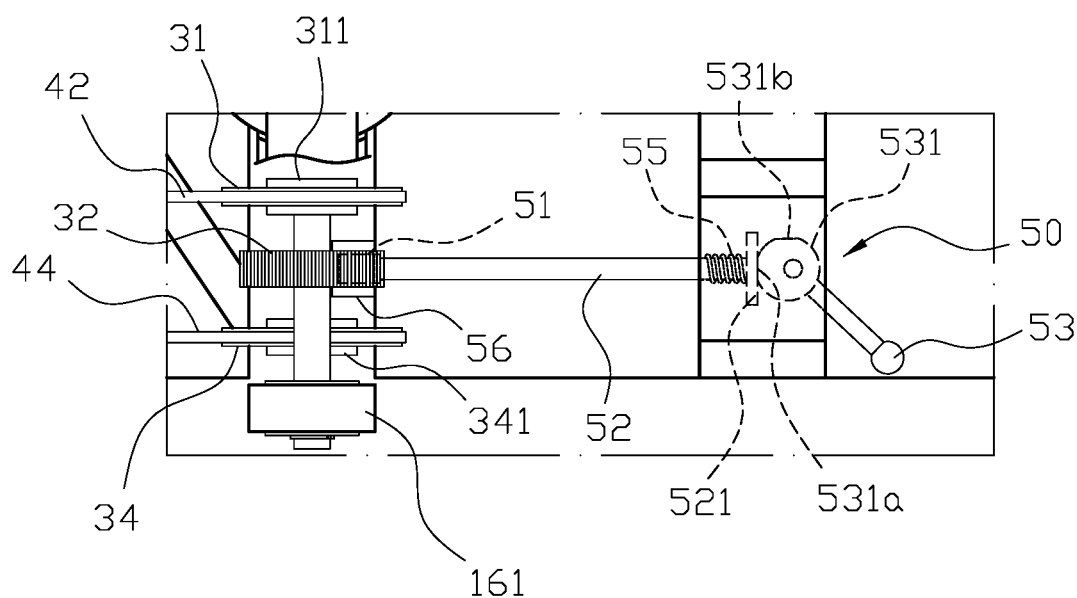
FIG. 13 is a third schematic view illustrating the transmission apparatus of the present invention that is operated.
Figure 14:
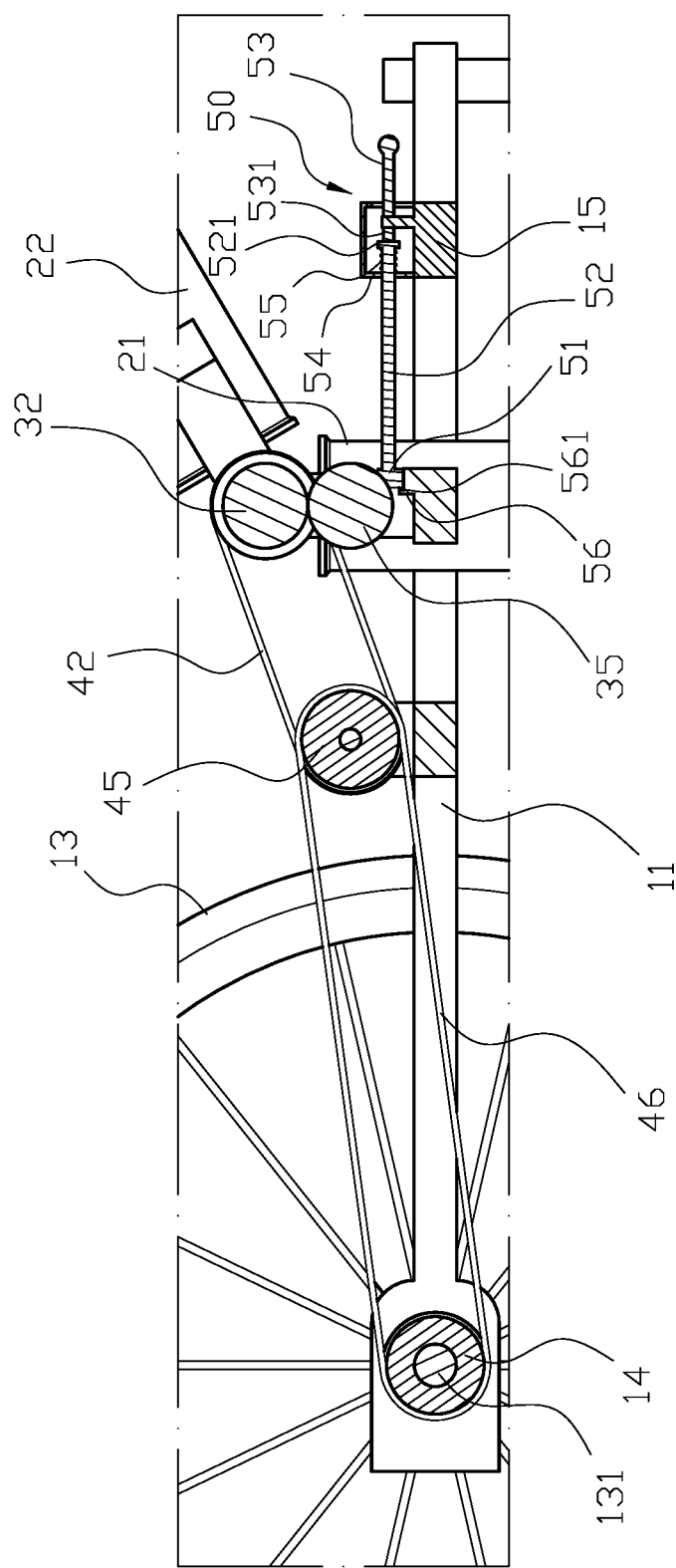
FIG. 14 is a fourth schematic view illustrating the transmission apparatus of the present invention that is operated.

In order to further understand the goal, characteristics and effect of the present invention, a number of embodiments along with the drawings are illustrated as follows:

Referring to FIGS. 1 and 5, the present invention provides a transmission apparatus for a leveraged wheelchair which comprises a wheelchair (10), a driving mechanism (20), a driving wheels set (30), a transmission wheels set (40), and a control unit (50). The wheelchair (10) has a frame body (11) to install at least a front wheel (12) and two rear wheels (13), and an output shaft (131) having an output wheel (14) installed thereon is connected between the two rear wheels (13). The frame body (11) comprises a first cross bar (15), a second cross bar (16), and a third cross bar (17) installed thereon which are formed parallel with the output shaft (131). Moreover, the first cross bar (15), the second cross bar (16), and the third cross bar (17) are arranged in sequence from a position adjacent to the front wheel (12). Furthermore, a front arm (161) vertically protrudes from the second cross bar (16) from a position adjacent to an end thereof, and two rear arms (171) respectively and vertically protrude from the third cross bar (17). The driving mechanism (20) has a first tube (21), a second tube (22), and a flexible connecting head (23). The first tube (21) is secured on the second cross bar (16) of the frame body (11). More specifically, the first tube (21) is adapted to vertically penetrate through the second cross bar (16), and the first tube (21) and the second cross bar (16) are connected through a welding method. Also, the first tube (21) comprises a right assembling piece (211) and a left assembling piece (212) respectively formed at two sides thereof and located symmetrically away from the second cross bar (16), and the right assembling piece (211) and the left assembling piece (212) respectively have a first supporting portion (211a) and a second supporting portion (212a). Additionally, the first tube (21) is configured to press against the second cross bar (16) through the first supporting portion (211a) and the second supporting portion (212a) so as to enable the driving mechanism (20) to be secured on the wheelchair (10). A turning shaft (24) is configured to axially penetrate through and pivotally connect to the first tube (21), and, in the present embodiment, the wheelchair (10) has two front wheels (12). The turning shaft (24) is connected to the front wheels (12) through a steering linkage (25) so as to achieve the turning action. The second tube (22) comprises a right connecting piece (221) and a left connecting piece (222) which are extended from an end of the second tube (22) and located symmetrically. The right connecting piece (221) is pivotally connected to the right assembling piece (211) so as to enable the second tube (22) to be moved relative to the first tube (21). A driving shaft (26) penetrates through and is secured with the left connecting piece (222), and the left connecting piece (222) is pivotally connected to the left assembling piece (212) through the driving shaft (26). Moreover, the driving shaft (26) is adapted to penetrate through the front arm (161). An actuating shaft (27), which axially penetrates through the second tube (22), has a handle (271) extending from an end of the actuating shaft (27), and the other end of the actuating shaft (27) is connected to the turning shaft (24) through the flexible connecting head (23). Through the flexible connecting head (23), the handle (271) and the turning shaft (24) are configured to have synchronous movement without intervening the relative movement between the first tube (21) and the second tube (22). The driving wheels set (30) comprises a first rotating wheel (31), a first gear (32), a driven shaft (33), a second rotating wheel (34), and a second gear (35). The first rotating wheel (31) is installed on the driving shaft (26) through a first ratchet wheel (311) so as to have synchronously forward rotation with the driving shaft (26). The first gear (32) is disposed on the driving shaft (26). The driven shaft (33) penetrates through and is coupled between the front arm (161) and the left assembling piece (212) so as to dispose the second rotating wheel (34) on the driven shaft (33) through a second ratchet wheel (341) and to enable the second rotating wheel (34) and the driven shaft (33) to have synchronously forward rotation. Furthermore, the second gear (35) disposed on the driven shaft (33) is engaged with the first gear (32). The transmission wheels set (40) comprises a first wheel body (41), a first flexible element (42), a second wheel body (43), a second flexible element (44), a third wheel body (45), a third flexible element (46), and a transmission axle (47). Each of the first flexible element (42), the second flexible element (44), and the third flexible element (46) is a belt or a chain. The transmission axle (47) axially penetrates through the first wheel body (41), the second wheel body (43), and the third wheel body (45), and two ends of the transmission axle (47) are respectively and pivotally connected to the two rear arms (171). The first flexible element (42) is connected between the first rotating wheel (31) and the first wheel body (41), and the second flexible element (44) is connected between the second rotating wheel (34) and the second wheel body (43) while the third flexible element (46) is connected between the third rotating wheel body (45) and the output wheel (14). Through the transmission wheels set (40), the first rotating wheel (31) and the second rotating wheel (34) are configured to drive the first wheel body (41) and the second wheel body (43) respectively. Thus, when operated forward or rearward, the handle (271) is adapted to drive the output shaft (131) to achieve power output. Referring to FIGS. 11 and 12, In addition, the control unit (50) installed on the frame body (11) of the wheelchair (10) comprises a pressing block (51), wherein the pressing block (51) is a plastic block or a rubber block. The control unit (50) is adapted to control the pressing block (51) to press the second gear (35) so as to secure the driven shaft (33) and the driving shaft (26) and to secure the handle (271) at specific positions after being moved. The pressing block (51) is connected to a column (52) at an end thereof, and the column (52) is positioned between the first cross bar (15) and the second cross bar (16). Also, an operating member (53) installed on the first cross bar (15) is coupled with the column (52) so as to have synchronous shift with the column (52) and the pressing block (51). The operating member (53) has a rotating cam (531) protruding from an end thereof, and the column (52) comprises a flat head (521). Moreover, the rotating cam (531) is configured to abut against the flat head (521), and the rotating cam (531) and the flat head (521) are accommodated in a shell (54). A spring (55) disposed on the column (52) is coupled between the shell (54) and the flat head (521). In addition, the second cross bar (16) comprises a platform (56) which has a pathway (561) thereon to support the pressing block (51) and to enable the pressing block (51) to slide thereon. The rotating cam (531) comprises a first plane (531*a*) and a second plane (531*b*). When the first plane (531*a*) is abutted against the flat head (521) of the column (52), the pressing block (51) is secured at a position which is abutted against the second gear (35). Also, when the second plane (531*b*) is abutted against the flat head (521) of the column (52), the pressing block (51) is secured at a position which is not abutted against the second gear (35).

In actual applications, referring to FIGS. 1 to 6, the driving mechanism (20) is secured on the second cross bar (16) of the frame body (11) through the first tube (21), and the first tube (21) is pivotally connected to the second tube (22) so as to enable the flexible connecting head (23) to connect to the turning shaft (24) of the first tube (21) and the actuating shaft (27) of the second tube (22). Moreover, the turning shaft (24) is connected to the front wheels (12) of the wheelchair (10) through the steering linkage (25). When the handle (271) is axially rotated, the actuating shaft (27) is axially rotated in the second tube (22), and the flexible connecting head (23) is rotated synchronously so as to directly drive the turning shaft (24) to rotate in the second tube (22). Thus, the steering linkage (25) is adapted to drive the front wheels (12) so as to control the forward direction of the wheelchair (10). Referring to FIGS. 7 to 10, the driving shaft (26) extended from the left connecting piece (222) of the driving mechanism (20) has the first rotating wheel (31) and the first gear (32) installed thereon, and the second gear (35) of the driving wheels set (30) is engaged with the first gear (32). Also, the first rotating wheel (31) is connected to the first wheel body (41) of the transmission wheels set (40) through the first flexible element (42), and the second rotating wheel (34) of the driving wheels set (30) is connected to the second wheel body (43) through the second flexible element (44). Furthermore, the third flexible element (46) is connected between the third wheel body (45) and the output wheel (14). When a user pulls the handle (271) rearward, the driving shaft (26) driven by the second tube (22) is adapted to drive the first gear (32) and the second gear (35), and the first rotating wheel (31) is not driven and remains stationary due to the one-way characteristic of the first ratchet wheel (311). Moreover, the second gear (35) is adapted to drive the second rotating wheel (34) through the driven shaft (33), and the second rotating wheel (34) is driven and rotated forward due to the one-way characteristic of the second ratchet wheel (341). Also, the force is sequentially transmitted through the second flexible element (44), the second wheel body (43), the transmission axle (47), the third wheel body (45), the third flexible element (46), the output wheel (14), and the output shaft (131) to the rear wheels (13) such that the wheelchair (10) is moved forward when the second tube (22) is pulled rearward. The relative movement between the first tube (21) and the second tube (22) is cooperated with the flexible connecting head (23) such that the handle (271) is adapted to be forward and rearward pulled or rotated axially so to achieve the moving and turning actions of the wheelchair (10). Similarly, when the handle (271) is pulled forward, the second rotating wheel (34) is not driven due to the one-way characteristic of the second ratchet wheel (341), and the force is transmitted from the first rotating wheel (31) sequentially through the first ratchet wheel (311), the first flexible element (42), the first wheel body (41), the transmission axle (47), the third wheel body (45), the third flexible element (46), the output wheel (14) to the output shaft (131) such that the wheelchair (10) is moved forward when the second tube (22) is pulled forward, thereby achieving the effects of bi-direction driving and labor saving. In addition, the driving mechanism (20), the driving wheels set (30), and the transmission wheels set (40) are not mutually interfered when the wheelchair (10) is operated, which effectively improves the practicability of the wheelchair (10).

More specifically, referring to FIGS. 1, and 11 to 14, the shell (54) is installed at the first cross bar (15) on the frame body (11) to accommodate the flat head (521) of the column (52) and the rotating cam (531) of the operating member (53), and the spring (55) is coupled between the shell (54) and the flat head (521). Also, the column (52) is extended to the second cross bar (16), and the pressing block (51) is slidably installed on the pathway (561) of the platform (56). When the position of the second tube (22) needs to be secured, a user can pull the operating member (53) to rotate the rotating cam (531), and the first plane (531*a*) is borne against the flat head (521) of the column (52). Moreover, the rotating cam (531) is adapted to push the column (52), and the pressing block (51) is abutted against the second gear (35) so as to secure the positions of the driving shaft (26) and the driven shaft (33). In addition, the driving shaft (26) is connected to the second tube (22) of the driving mechanism (20) so as to secure the handle (271) at a specific position, so that the handle (271) is at a stationary position when the wheelchair is not operated. Moreover, when a user is going to get out of the wheelchair (10), he/she can pull the handle (271) forward so as to create more space for leaving. Furthermore, the handle (271) is adapted to control the front wheels (12) for turning while the rear wheels (13) are adapted to keep rotating forward, which enables the wheelchair (10) to be operated by a user and pushed by a caregiver at the same time. Similarly, a user can pull the operating member (53) to rotate the rotating cam (531) so as to enable the second plane (531b) to bear against the flat head (521), and the spring (55) is adapted to pull the column (52) back to its initial position, so that the pressing block (51) is not borne against the second gear (35), and the second tube (22) is movable again.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A transmission apparatus for a leveraged wheelchair comprising,
    a wheelchair having a frame body to install at least a front wheel and two rear wheels, and an output shaft, which has an output wheel installed thereon, connected between the two rear wheels; the frame body comprising a first cross bar, a second cross bar, and a third cross bar installed thereon which are formed parallel with the output shaft; the first cross bar, the second cross bar, and the third cross bar arranged in sequence from a position adjacent to the front wheel; a front arm vertically protruding from the second cross bar from a position adjacent to an end thereof, and two rear arms respectively and vertically protruding from the third cross bar;
    a driving mechanism having a first tube, a second tube, and a flexible connecting head, and the first tube secured on the second cross bar of the frame body; the first tube comprising a right assembling piece and a left assembling piece respectively formed at two sides thereof and located symmetrically away from the second cross bar, and a turning shaft configured to axially penetrate through and pivotally connect to the first tube; the turning shaft connected to the front wheel so as to achieve the turning action; the second tube comprising a right connecting piece and a left connecting piece which are extended from an end of the second tube and located symmetrically; the right connecting piece pivotally connected to the right assembling piece so as to enable the second tube to be moved relative to the first tube; a driving shaft penetrating through and secured with the left connecting piece, and the left connecting piece pivotally connected to the left assembling piece through the driving shaft; the driving shaft adapted to penetrate through the front arm; an actuating shaft, which axially penetrates through the second tube, having a handle extending from an end of the actuating shaft, and the other end of the actuating shaft connected to the turning shaft through the flexible connecting head; through the flexible connecting head, the handle and the turning shaft configured to have synchronous movement without intervening the relative movement between the first tube and the second tube;
    a driving wheels set comprising a first rotating wheel, a first gear, a driven shaft, a second rotating wheel, and a second gear; the first rotating wheel installed on the driving shaft through a first ratchet wheel so as to have synchronously forward rotation with the driving shaft; the first gear disposed on the driving shaft; the driven shaft penetrating through and coupled between the front arm and the left assembling piece so as to dispose the second rotating wheel on the driven shaft through a second ratchet wheel and to enable the second rotating wheel and the driven shaft to have synchronously forward rotation; the second gear, which is disposed on the driven shaft, engaged with the first gear; and
    a transmission wheels set comprising a first wheel body, a first flexible element, a second wheel body, a second flexible element, a third wheel body, a third flexible element, and a transmission axle; the transmission axle axially penetrating through the first wheel body, the second wheel body, and the third wheel body, and two ends of the transmission axle respectively and pivotally connected to the two rear arms; the first flexible element connected between the first rotating wheel and the first wheel body, and the second flexible element connected between the second rotating wheel and the second wheel body while the third flexible element connected between the third rotating wheel body and the output wheel; through the transmission wheels set, the first rotating wheel and the second rotating wheel configured to drive the first wheel body and the second wheel body respectively; when operated forward or rearward, the handle adapted to drive the output shaft to achieve power output.

2. The transmission apparatus for a leveraged wheelchair of claim 1, wherein each of the first flexible element, the second flexible element, and the third flexible element is a belt or a chain.

3. The transmission apparatus for a leveraged wheelchair of claim 1, wherein the wheelchair has two front wheels, and the turning shaft is connected to the front wheels through a steering linkage.

4. The transmission apparatus for a leveraged wheelchair of claim 1, wherein the first tube is adapted to vertically penetrate through the second cross bar, and the first tube and the second cross bar are connected through welding method.

5. The transmission apparatus for a leveraged wheelchair of claim 4, wherein the right assembling piece and the left assembling piece respectively have a first supporting portion and a second supporting portion, and the first tube is configured to press against the second cross bar through the first supporting portion and the second supporting portion.

6. The transmission apparatus for a leveraged wheelchair of claim 1, wherein a control unit installed on the frame body of the wheelchair comprises a pressing block, and the control unit is adapted to control the pressing block to press the second gear so as to secure the driven shaft and the driving shaft and to secure the handle at specific positions after being moved.

7. The transmission apparatus for a leveraged wheelchair of claim 6, wherein the pressing block is connected to a column at an end thereof, and the column is positioned between the first cross bar and the second cross bar; an operating member installed on the first cross bar is coupled with the column so as to have synchronous shift with the column and the pressing block.

8. The transmission apparatus for a leveraged wheelchair of claim 7, wherein the operating member has a rotating cam protruding from an end thereof, and the column comprises a flat head; the rotating cam is configured to abut against the flat head, and the rotating cam and the flat head are accommodated in a shell, and a spring disposed on the column is coupled between the shell and the flat head.

9. The transmission apparatus for a leveraged wheelchair of claim 8, wherein the second cross bar comprises a platform which has a pathway thereon to support the pressing block and to enable the pressing block to slide thereon.

10. The transmission apparatus for a leveraged wheelchair of claim 8, wherein the rotating cam comprises a first plane and a second plane; when the first plane is abutted against the flat head of the column, the pressing block is secured at a position which is abutted against the second gear; when the second plane is abutted against the flat head of the column, the pressing block is secured at a position which is not abutted against the second gear.

* * * * *